US009857275B2

(12) United States Patent
Gardarin, Jr.

(10) Patent No.: US 9,857,275 B2
(45) Date of Patent: Jan. 2, 2018

(54) METHOD FOR DETERMINING THE AERODYNAMIC MOMENT OF RESISTANCE OF A WHEEL

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Benoit Gardarin, Jr., Clermont-Ferrand (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 393 days.

(21) Appl. No.: 14/410,121

(22) PCT Filed: Jun. 19, 2013

(86) PCT No.: PCT/EP2013/062695
§ 371 (c)(1),
(2) Date: Dec. 22, 2014

(87) PCT Pub. No.: WO2014/001165
PCT Pub. Date: Jan. 3, 2014

(65) Prior Publication Data
US 2015/0185112 A1    Jul. 2, 2015

(30) Foreign Application Priority Data

Jun. 27, 2012 (FR) ...................... 12 56123

(51) Int. Cl.
*G01P 3/00* (2006.01)
*G01P 5/00* (2006.01)
(Continued)

(52) U.S. Cl.
CPC .......... *G01M 17/013* (2013.01); *G01M 9/062* (2013.01); *G01P 3/34* (2013.01)

(58) Field of Classification Search
CPC .. G01M 9/062; G01M 17/013; G01M 17/022; G01M 9/06; G01L 3/00; G01P 3/34
(Continued)

(56) References Cited

FOREIGN PATENT DOCUMENTS

| CN | 1163398 A | 10/1997 |
|---|---|---|
| CN | 1839302 A | 9/2006 |

(Continued)

OTHER PUBLICATIONS

International Search Report for PCT/EP2013/062695 dated Jul. 29, 2013.

*Primary Examiner* — An Do
(74) *Attorney, Agent, or Firm* — Dickinson Wright, PLLC

(57) ABSTRACT

A method for determining the aerodynamic moment of resistance $M_{aero\text{-}EM}$ of a wheel by calculating the variation with respect to time, of the product of the rotational speed of at least one wheel set in rotation about an axis and of the inertia of the said wheel about the said axis, the wheel being equipped with a device for picking off and recording the numerical values of its rotational speed. The wheel is protected by a removable cap and in is subjected to a flow of air.

7 Claims, 1 Drawing Sheet

(51) Int. Cl.
*G01M 17/013* (2006.01)
*G01M 9/06* (2006.01)
*G01P 3/34* (2006.01)

(58) Field of Classification Search
USPC .............................. 702/33, 41, 44, 142, 145
See application file for complete search history.

(56) References Cited

FOREIGN PATENT DOCUMENTS

| | | | |
|---|---|---|---|
| CN | 101650256 A | 2/2010 | |
| CN | 202956259 U | 5/2013 | |
| DE | 19527742 A1 | 1/1997 | |
| DE | 102008046552 A1 | 3/2010 | |
| JP | 11509926 A | 8/1999 | |
| JP | 2007186166 A | 7/2007 | |
| WO | WO 9705465 A1 * | 2/1997 | .............. G01M 9/06 |

* cited by examiner

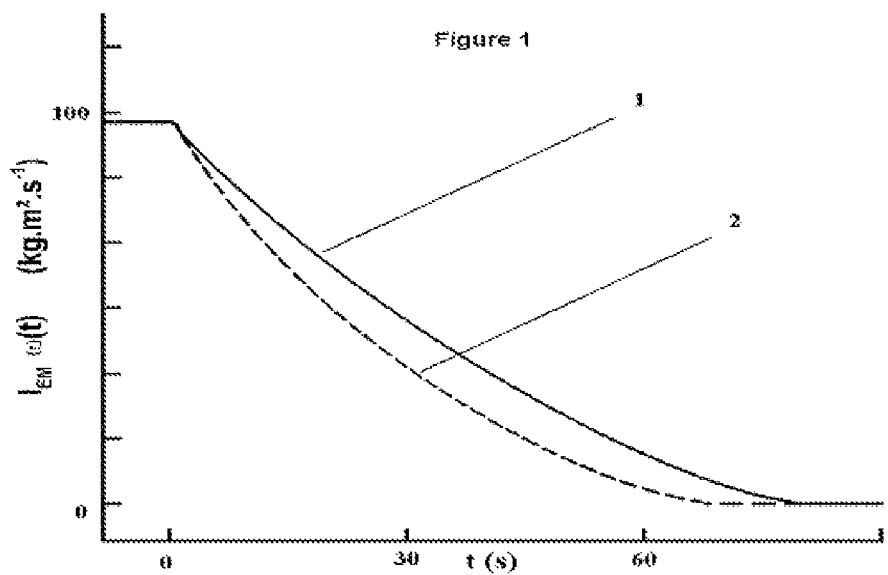
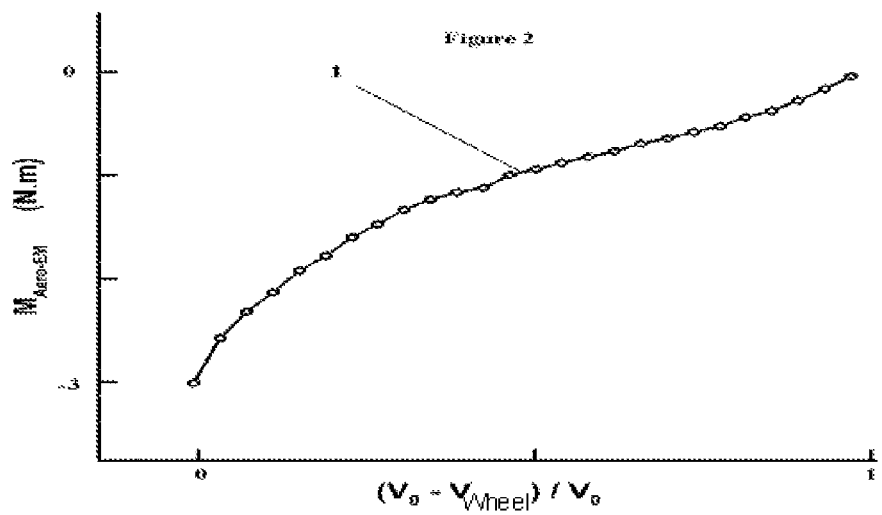

METHOD FOR DETERMINING THE AERODYNAMIC MOMENT OF RESISTANCE OF A WHEEL

This application is a 371 national phase entry of PCT/EP2013/062695, filed 19 Jun. 2013, which claims benefit of French Patent Application Serial No. 1256123, filed 27 Jun. 2012, the entire contents of which are incorporated herein by reference for all purposes.

BACKGROUND

1. Field

The disclosure relates to a method for determining precisely the aerodynamic moment of resistance of a wheel. This method applies to land transport vehicles.

2. Description of Related Art

It will be recalled that a wheel is defined as being made up of a rim, of a wheel disc and of a tire. The tire, also referred to as the casing, is mounted on the rim to form a wheel.

Regulatory measures of fuel consumption and pollution are currently made on light cars and light utility vehicles in numerous countries. Unfortunately, these measurements do not make it possible to determine precisely the tire contribution to the resistance to forward travel.

It will be recalled that the resistance to forward travel caused by a tire comprises the following three components: the rolling resistance drag (or force), the aerodynamic drag and the aerodynamic moment of resistance (or ventilation torque).

So, in order to calculate or estimate this resistance to forward travel, practitioners take measurements, on a test bed, of the tire mounted simply on the rim, or even resort to simulations using computer software.

However, these measurements or simulations, which are performed on a test bed, do not provide values of the aerodynamic moment of resistance that are close to the values encountered under actual conditions of use of a tire because the current measurement techniques simply estimate the aerodynamic moment of resistance simply by allowing the tire mounted on a rim and arranged in an open environment free of any protection to decelerate.

Physical diameters such as the aerodynamic moment of resistance are, for the time being, the subject of mathematical estimates which despite everything remain unsatisfactory because they are estimated insufficiently.

Thus, a more precise and more realistic measurement of the aerodynamic moment of resistance would allow for a better evaluation of the resistance to forward travel caused by a wheel, and therefore of the impact this has on fuel consumption.

So, there remains a need to be able to have use of a method for determining very precisely, reliably and repeatably, the aerodynamic moment of resistance of a wheel under conditions similar to those of usual conditions of use.

SUMMARY

The subject of an embodiment of the invention is therefore a method for determining the aerodynamic moment of resistance $M_{aero-EM}$ of a wheel by calculating the variation, with respect to time, of the product of the rotational speed of the wheel set in rotation about an axis and of the inertia of the wheel about the axis, the wheel being equipped with a device for picking off and recording the numerical values of its rotational speed.

The invention is characterized in that the said wheel is protected by a removable cap, such that the wheel, set in contact with and initially at a time $t_0$ driven by, a rolling road is taken out of contact with the road at a time $t_1$ subsequent to $t_0$, while at the same time continuing to be subjected to a flow of air, and in that the measurements of the rotational speed $\omega(t)$ of the said wheel, picked up as a function of time, are input into the following mathematical formula:

$$I_{EM}(d\omega(t)/dt) = M_{aero-EM}(t) + M_f(t) \tag{I}$$

where $I_{EM}$ represents the value of the moment of inertia of the wheel about the axis of rotation, $\omega(t)$ represents the instantaneous rotational speed of the wheel, $M_f(t)$ represents the value of the moment of friction of the hub of the wheel, and $M_{aero-EM}(t)$ represents the instantaneous aerodynamic moment of resistance of the wheel.

The method according to an embodiment of the invention offers the advantage of being able to be applied to any type of rim, wheel trim or tire, of being inexpensive to realize, and of being simple and quick to implement.

Finally, this method makes it possible rapidly and easily to provide numerical data similar to the data encountered on a vehicle in a usual driving situation.

Protecting the wheel with a removable cap according to the method of the invention makes it possible to reconstruct the actual conditions in which a wheel runs, i.e. to position the wheel in a semi-protected enclosure, usually consisting of the wheel arch of a vehicle. The cap according to the invention may have any three-dimensional geometric shape as close as possible to the shapes encountered in land vehicle wheel arches.

Hitherto, the rolling resistance of a new tire mounted on a rim and pressurized has been measured using models that are standardized in a laboratory. Examples of such models include the standard ISO/FDIS 28580 which considers various physical and mathematical parameters in order to measure or calculate them; the results obtained collectively making it possible to evaluate and/or to quantify the rolling resistance of a tire as precisely as possible.

The parameter relating to the dynamics of a wheel set of a land transport vehicle (an automobile, a van, a heavy goods vehicle), is made up of two different movements: a horizontal translational movement and a rotational movement. These two movements induce stresses connected with the flow of air around the tire because the flow of air generates a pressure field and a viscous friction field at the surface of a tire.

The aerodynamic stresses applied to such wheel sets give rise firstly to a longitudinal drag resistive force and secondly to an aerodynamic moment of resistance which opposes the rotation of the wheels.

While the longitudinal resistive drag force is easily evaluated using the present-day mathematical models that use the measurements obtained in a wind tunnel, the aerodynamic moment of resistance is not taken into consideration in wind tunnel measurements. However, this resultant, hitherto considered to be an unwanted component, does have a not-insignificant influence on the fuel consumption results connected with the resistance to forward travel of the wheel.

The method according to an embodiment of the invention, which is simple to realize, allows this aerodynamic moment of resistance to be quantified under conditions similar to those encountered by a wheel in an actual driving situation.

Specifically, the method according to an embodiment of the invention places the wheel under conditions very similar to usual driving conditions because the wheel is, on the one hand, protected by a removable cap intended to reproduce the protective effects of a vehicle wheel arch and, on the other hand, subjected to a flow of air.

Such a situation is not found in the application of standardized laboratory models because the wheel is placed in an open environment with no protection at all (because of the absence of the cap) and is not subjected to a flow of air, except for the air flow it generates through its own operation.

Thus, the stresses associated with friction and pressure giving rise to the aerodynamic moment of resistance differ in the method according to an embodiment of the invention compared with the measurement practices hitherto used.

For preference, the flow of air used according to the method of an embodiment of the invention has a main direction substantially parallel to that of the wheel.

The flow of air may have a main direction at an angle of between −40° and +40° with respect to that of the wheel. This alternative makes it possible to reproduce as exactly as possible the effects of a crosswind, headwind or tailwind in an actual driving situation.

For preference, in order to implement this method, the axis of the wheel remains fixed relative to the immobile ground. This means that there is no relative motion between the wheel and the rolling road and therefore that the axis of the wheel moves in the same way as that of the rolling road.

For preference, the flow of air has a speed equal to or different from that of the rolling road.

The wheel preferably comprises at least one means of holding the wheel suspension.

BRIEF DESCRIPTION OF DRAWINGS

The invention will now be described with the aid of the examples and figures which follow, which are not in any way limiting and in which:

FIG. 1 depicts the variation of the product $[I_{EM} \, \omega(t)]$ as a function of time, according to an embodiment of the invention, for two different wheels, one comprising a tire with a smooth sidewall and the other tire with a sidewall covered with rough elements, FIG. 2 depicts the variation in the instantaneous aerodynamic moment of resistance $M_{aero-EM}(t)$ as a function of the ratio established between the speed of the flow of air and the speed of the wheel, according to an embodiment of the method of the invention.

DETAILED DESCRIPTION OF SPECIFIC EMBODIMENTS

In order to implement this method, a wheel is placed on a rolling road in an aerodynamic wind tunnel. The wheel is kept in contact with the rolling road. The wheel is connected to a means of taking it out of contact with the rolling road. A means for holding the wheel in each of its positions allows it to be stabilized while measurements are being taken.

The wheel is equipped with a device intended to pick off and record the numerical values of its rotational speed $\omega(t)$.

Having run the wheel on a rolling road for a given length of time, the wheel is taken away from the rolling road so that it breaks contact with the rolling road. The wheel therefore moves freely, subjected simply to the flow of air from the wind generator. The rotational speed of the wheel is recorded throughout the operation.

According to an alternative form of embodiment of the method according to the invention, the wheel may be mounted on a vehicle which will then be fixed to the ground using pylons. A means of raising the vehicle allows the vehicle to be taken away from the rolling road, thus allowing the wheel to continue to rotate under the sole influence of the wind generator. Fixing the vehicle to the ground makes it possible firstly to dictate the attitude of the vehicle and, secondly, to stabilize it as it is raised. The wheels mounted on the vehicle are initially placed in contact with a rolling road intended to bring the wheel up to a desired rotational speed $V_0$. The wind generator subjects the vehicle to a flow of air of the same speed $V_0$.

Applying mathematical formula (I) below makes it possible to obtain the value of the aerodynamic moment of resistance $M_{aero-EM}(t)$ of the wheel as a function of time using the following mathematical formula (I):

$$I_{EM}(d\omega(t)/dt) = M_{aero-EM}(t) + M_f(t) \tag{I}$$

$I_{EM}$, which represents the value of the moment of inertia of the wheel, can be measured for example using a torsion pendulum.

$M_f(t)$, which represents the value of the moment of friction of the hub of the wheel, can be calculated, for example, from the technical data supplied by the bearing manufacturer.

The value $(d(\omega)/dt)$ for $t=t_0$ (namely when the wheel leaves the rolling road) is obtained from the recording of the rotational speed as a function of time.

FIG. 1 shows the results comparing the variation in aerodynamic moments of resistance of a tire with a smooth side wall and of a tire with sidewalls covered with rough elements both mounted on an identical rim. These two tires are mounted on the front right side of a passenger car. The speed $V_0$ of the wheels driven by the rolling road is equal to 120 km/h. The wind tunnel generates a flow of air at a speed of 120 km/h.

In this FIG. 1, the curve 1 corresponds to the tire with the smooth sidewall and the curve 2 to the tire with the sidewalls covered with rough elements. The two wheels are made up of identical rims. FIG. 1 shows that the rotational speed of each tire mounted on rim does not change in the same way. The rough elements are defined as being elements made of a rubber of substantially cylindrical shape, of a height equal to around 4 mm and of a diameter equal to around 4 mm. In this instance, 250 elements are arranged uniformly on each of the two sidewalls.

Specifically, the tire with the rough sidewalls induces a more rapid deceleration than the tire with the smooth sidewall, because of the higher parietal stresses on the tire with the rough sidewalls.

At the instant $t=t_0$, the difference in behaviour of each type of tire exhibits a difference in ventilation torque of around 1 N·m. This measurement can be considered to be repeatable because it has a standard deviation of 0.01 N·m.

This difference in value of the aerodynamic moment of resistance is equivalent in a passenger car equipped with four wheels to a difference in aerodynamic drag representing approximately 3% of the overall drag of the vehicle.

This difference in value of the aerodynamic moment of resistance leads, for a passenger car equipped with four wheels, to a difference in fuel consumption which is equivalent to a difference in aerodynamic drag representing approximately 3% of the overall aerodynamic friction drag of the vehicle.

FIG. 2 corresponds to a situation in which the direction of the main flow of air is aligned with that of the wheel but in which the speed of the flow of air is different from that of the wheel. In other words, the speed $V_0$ of the wind generator is the same and still equal to 120 km/h, and the speed of the wheel $V_{wheel}$ is variable, and varies progressively from 120 km/h to 0 km/h.

FIG. 2 corresponds to the actual situation in which the wheel, protected by a cap, is experiencing a headwind because $V_0 > V_{wheel}$.

The aerodynamic moment of resistance $M_{aero-EM}$ is measured for various wheel speed values. Each value of $M_{aero-EM}$ is then plotted as a function of the ratio $[(V_0 - V_{wheel})/V_0]$ which is equal to zero when $V_{wheel} = V_0 = 120$ km/h, and which is equal to one when $V_{wheel} = 0$ and $V_0 = 120$ km/h. That then yields the curve 1 depicted in FIG. 2.

As the curve 1 of FIG. 2 shows, it may be said that the aerodynamic moment of resistance experienced by a vehicle driving at 60 km/h, and experiencing a headwind also having a speed of 60 km/h, is lower (approximately 1 N·m in absolute terms, for $[(V_0 - V_{wheel})/V_0] = 0.5$) than the aerodynamic moment of resistance experienced by the same vehicle driving at 120 km/h in the absence of external wind (3 N·m approximately in absolute terms, for $[(V_0 - V_{wheel})/V_0] = 0$) despite the fact that the relative wind is the same in both instances, namely 120 km/h.

The invention claimed is:

1. A method for determining the aerodynamic moment of resistance, $M_{aero-EM}$ of a wheel that is equipped with a device for picking off and recording the numerical values of its rotational speed and that is protected by a removable cap, comprising:

setting the wheel in contact with a rolling road initially at a time $t_0$;

taking the wheel out of contact with the road at a time $t_1$ subsequent to $t_0$, while at the same time continuing to subject the wheel to a flow of air recording numerical values of the rotational speed of the wheel set in rotation about an axis;

calculating the variation, with respect to time, of the product of the rotational speed of the wheel set in rotation about an axis, and of the inertia of the wheel about the axis, inputting the measurements of the rotational speed ω(t) of the wheel, picked up as a function of time, into the following mathematical formula:

$$I_{EM}(d\omega(t)/dt) = M_{aero-EM}(t) + M_f(t) \quad (I)$$

where $I_{EM}$ represents the value of the moment of inertia of the wheel about the axis of rotation, ω(t) represents the instantaneous rotational speed of the wheel, $M_f(t)$ represents the value of the moment of friction of the hub of the wheel, and $M_{aero-EM}(t)$ represents the instantaneous aerodynamic moment of the wheel.

2. The method according to claim 1, wherein the flow of air has a main direction substantially parallel to that of the wheel.

3. The method according to claim 1, wherein the flow of air has a main direction at an angle of between −40° and +40° with respect to that of the wheel.

4. The method according to claim 1, wherein the axis of the wheel remains fixed relative to the ground.

5. The method according to claim 1, wherein the flow of air has a speed identical to that of the rotational-drive means.

6. The method according to claim 1, wherein the flow of air has a speed different from that of the rotational-drive means.

7. The method according to claim 1, wherein the wheel comprises at least one means of holding the wheel suspension.

* * * * *